(12) United States Patent
Kessler et al.

(10) Patent No.: US 8,198,993 B2
(45) Date of Patent: Jun. 12, 2012

(54) SYSTEM FOR MONITORING THE TIRE PRESSURE IN VEHICLES

(75) Inventors: Ralf Kessler, Pfinztal (DE); Holger Köninger, Walzbachtal (DE); Karsten Sandrock, Bretten (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 483 days.

(21) Appl. No.: 12/552,714

(22) Filed: Sep. 2, 2009

(65) Prior Publication Data

US 2010/0052886 A1 Mar. 4, 2010

(30) Foreign Application Priority Data

Sep. 4, 2008 (DE) .......................... 10 2008 045 867

(51) Int. Cl.
*B60C 23/00* (2006.01)
(52) U.S. Cl. ...................................... 340/447; 340/442
(58) Field of Classification Search .................. 340/447, 340/442; 701/78
See application file for complete search history.

(56) References Cited

U.S. PATENT DOCUMENTS

| 6,445,286 | B1 | 9/2002 | Kessler et al. |
| 2003/0156022 | A1 | 8/2003 | Saheki et al. |
| 2005/0110623 | A1 | 5/2005 | Schulze et al. |
| 2006/0161327 | A1 | 7/2006 | Emmerich et al. |
| 2007/0069879 | A1 | 3/2007 | Kuchler |
| 2007/0205881 | A1 * | 9/2007 | Breed ........................... 340/447 |

FOREIGN PATENT DOCUMENTS

DE 10 2004 024 388 A1 12/2005

* cited by examiner

*Primary Examiner* — Shirley Lu

(57) ABSTRACT

Described is a procedure for controlling the transmission operation of a tire pressure monitoring device (1) arranged in a pneumatic tire of a vehicle, whereby data telegrams are transmitted in a normal mode of operation (13) in first time intervals, and there is a changeover from the normal mode of operation (13) to a pressure drop mode, if an inspection of the pressure signals indicates a drop in the pressure of a drop speed exceeding a pre-defined threshold value, and data telegrams are transmitted in the pressure drop mode in second time intervals, which are shorter than the first time intervals, and the tire pressure monitoring devices (1) are put into a travel starting mode (10, 11, 12) at the beginning of the travel by activation a roll sensor. Data telegrams are transmitted in the travel starting mode in shorter third time intervals as compared to the normal mode of operation.

11 Claims, 2 Drawing Sheets

SYSTEM FOR MONITORING THE TIRE PRESSURE IN VEHICLES

The invention refers to a system for monitoring the tire pressure in vehicles, comprising tire pressure monitoring devices, which are to be arranged in pneumatic tires of the vehicle and each comprise a pressure sensor, a roll sensor, a control unit, a power source and a transmitter, and an evaluation unit to be installed in the vehicle in a stationary manner comprising a receiver for evaluating data telegrams transmitted by the tire pressure monitoring devices, said data telegrams containing a pressure information and a characteristic identifier of the tire pressure monitoring device. Such a system is known from EP 1 053 114 B1.

The tire pressure monitoring devices of such a system send out pressure signals together with a characteristic identifier enabling the evaluation unit to assign the pressure signals to the individual wheels of the vehicle. Since the tires of a vehicle and thereby the tire pressure monitoring devices installed in them can be exchanged or interchanged, the evaluation unit must start an assignment of the characteristic identifiers for the respective wheel positions at the beginning of every travel. This assignment takes place through a statistical evaluation of the reception level. Signals sent out from tire pressure monitoring devices in vehicle tires, which are arranged closer to a receiver of the evaluation unit, are received on average with a higher reception level than signals coming from tire pressure monitoring devices arranged in vehicle tires that are at a greater distance.

Tire pressure monitoring devices transmit signals at shorter time intervals at the beginning of a travel in order to enable the evaluation unit to receive a sufficient number of data telegrams as quickly as possible for a statistical evaluation and subsequently to enable the assignment of the characteristic identifiers to individual wheel positions as early as possible.

On one hand, it is desirable to make a clear assignment of the characteristic identifiers to the individual wheel positions as early as possible after the beginning of a travel, which suggests that the tire pressure monitoring devices should send a larger number of data telegrams at shorter time intervals. But, on the other hand, the batteries of tire pressure monitoring devices should not be subjected to too much load resulting from the increased transmission rate at the beginning of the travel, which suggests to start the normal mode of operation with a low transmission rate as quick as possible.

SUMMARY OF THE INVENTION

Thus, the purpose of the invention is to provide a solution, by means of which an assignment of the characteristic identifiers of the individual tire pressure monitoring devices to the respective wheel positions can be made as quickly as possible at the beginning of the travel and with minimum possible transmission effort.

The solution lies in a system according to claim 1 and a method comprising the features mentioned in claim 12. Further developments of the invention are the matter of dependent claims.

According to the invention, a lower transmission effort suffices to enable the central evaluation unit to assign the characteristic identifiers of the tire pressure monitoring devices to a respective wheel position at the beginning of the travel with an increased reliability.

Upon switching to the travel starting mode, the transmission of a data packet comprising several data telegrams is initiated. After a first part of the data packet is transmitted, for example the first data telegram, it is checked at least once if the roll sensor still detects a turning of the wheel; if not, the process of transmitting the data packet is stopped. If it is later detected that the travel was stopped only for a short duration, e.g. for less than 5 minutes, then the process of transmitting the data packet continues from the point at which it was previously stopped. If the travel is resumed only after a long break, during which tires could have been changed, the process of transmitting the data packet is started again. In this way, it is ensured that in the travel starting mode, every tire pressure monitoring device always transmits while the wheel is turning the appropriate number of data telegrams that are required for a reliable assignment of their characteristic identifier.

It is important to transmit data telegrams while the wheel is turning because the reception level, with which data telegrams are received from a tire pressure monitoring unit, does not only depend upon the distance of the corresponding wheel from the receiver. When a wheel is turning, the reflection conditions and orientation of the transmitter of a tire pressure monitoring unit change with respect to a receiver installed on the vehicle in a stationary manner, which in turn influences the reception level.

If a vehicle stops again shortly after the roll sensor is activated, the statistic evaluation of the reception level of individual data telegrams may be distorted, due to a particularly favorable or unfavorable orientation of the transmitter of the tire pressure monitoring device. Hence, data telegrams that are transmitted when the vehicle is not moving are often useless for an assignment of the characteristic identifiers to the individual wheel positions and could even lead to a faulty assignment, which can only be rectified much later after the receipt of data telegrams that are transmitted in the normal mode of operation. According to the invention, the energy required for the transmission of signals that cannot be evaluated at all or can only be evaluated in a limited manner because of the position of the tire pressure monitoring device, will be saved to a great extend.

In order to enable the statistical evaluation of the reception level, a receiver of the central evaluation unit can be installed near a vehicle axle, for example. Then, data telegrams coming from tire pressure monitoring devices that are installed on the wheels of these axles will be received on average with a higher reception level than data telegrams coming from tire pressure monitoring devices that are installed away from the axle. A differentiation between the left and right wheels is possible, for example, by means of a sensor in the tire pressure monitoring devices, which records the direction of turning of a wheel. It is also possible to position a receiver of the evaluation unit on the vehicle in such a manner that it will be at different distances from all wheels, so that a statistical evaluation of the reception level will not only determine the axle on which the wheel of the tire pressure monitoring device is fixed, but also the overall position of the wheel. The evaluation unit can also be fitted with several receivers, which are arranged at different positions for better statistical evaluation.

An advanced version of the invention gives the added advantage of switching from the normal mode of operation to the travel starting mode only if the rolling switch has not detected a turning of the wheels before during a pre-defined time span. This will prevent the travel starting mode from restarting every time the vehicle stops in the stop-and-go traffic.

In another advanced version of the invention, the first part of the data packet will contain several data telegrams; thus, a check of the roll sensor and an interruption of the process of transmission—if a turning of the wheel is not detected upon checking—will take place only after, for example, at least 3, preferably 4 to 6 data telegrams are sent. In case any of the tires has lost plenty of air when the vehicle is parked, it is advantageous to convey this information to the vehicle driver as early as possible, even though the central evaluation unit is unable to detect (at this point of time) which tire is flat. By sending several data telegrams one after the other upon activation of the roll sensor, even when the vehicle stops immediately afterwards, the probability of receiving at least one of these data telegrams increases, so that the evaluation unit can receive the information that one of the tires has not enough air.

An assignment of the characteristic identifiers of the data telegrams to the individual wheel positions can be made on a second part of the data packet, which is sent only when a check of the roll sensor shows that the wheel is still turning.

With respect to prior art, a considerable improvement can be achieved just by providing a one-time checking when transmitting a data packet in the travel starting mode to find out whether the roll sensor is still detecting a turning of the wheel. In order to further reduce the risk of sending useless data telegrams, several inspections of the roll sensor and interruptions can be executed while transmitting a data packet; for example, after transmitting every fifth data telegram, after transmitting every third data telegram or even after transmitting every data telegram, so that the data packet is not sent in only two parts, but in three, four or even more parts.

BRIEF DESCRIPTION OF THE DRAWINGS

Further details of the system put forth by the invention are explained by means of an embodiment with reference to the diagram attached herewith. In the figures.

DETAILED DESCRIPTION

Figure 1:
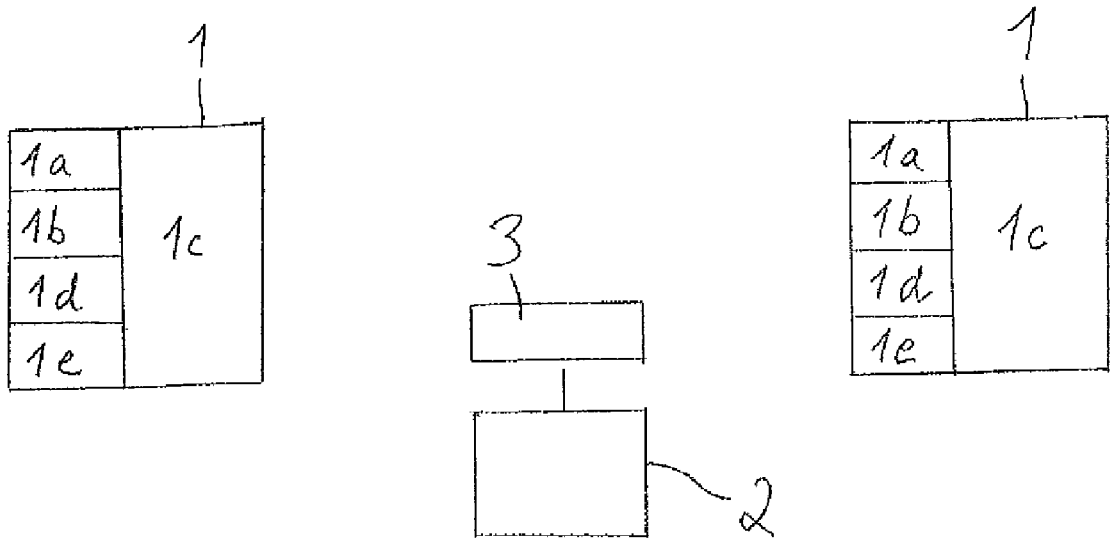
FIG. 1 shows a schematic presentation of a tire pressure monitoring system according to the invention.
Figure 1:

A system for monitoring the tire pressure in vehicles has several tire pressure monitoring devices 1, which are positioned in the pneumatic tires of a vehicle (one each in every tire), and a pressure sensor 1a, a roll sensor 1b, a control unit 1c, a power source 1d and a transmitter 1e. In addition to this, the system includes an evaluation unit 2 installed on the vehicle in a stationary manner, which evaluates the data telegrams sent by the tire pressure monitoring device 1 that contain the pressure information and a characteristic identifier of the sending tire pressure monitoring device. A receiver 3 is connected to the evaluating unit 2.

Since the tires of a vehicle and thereby the tire pressure monitoring devices 1 assigned to these tires can be changed, the evaluation unit 2 checks the prevalent assignment of the characteristic identifiers to the individual wheel positions at the beginning of every travel and if required, carries out a learning process, with which a new assignment of the characteristic identifiers can be made to the individual wheel positions. During this learning process, a statistical evaluation of the reception level of the data telegrams sent by different tire pressure monitoring devices 1 is made. In the example shown, the receiver 3 of the evaluation unit 2 is positioned near the front axle of the vehicle, so that data telegrams from the front wheels can be received with a higher reception level on average, i.e. with a higher intensity, than data telegrams from the tire pressure monitoring devices 1 of the rear wheels. The roll sensor 1b of the tire pressure monitoring devices 1 is sensitive to the direction of turning of the wheel; thus, the data telegrams that are sent contain not only the pressure information and the characteristic identifier, but also the information on the direction of turning of the corresponding wheel (left or right).

In the normal mode of operation, the tire pressure monitoring devices 1 send data telegrams in first time intervals, which preferably depend upon the speed of the vehicle. This ensures that data telegrams can be sent at higher speed in shorter time intervals as compared to slow travel, which implies a smaller amount of risk. For example, the distance between data telegrams can be inversely proportional to the speed of the vehicle. However, it is preferable to adapt the time intervals between the data telegrams gradually to a change in the speed of the vehicle.

The tire pressure monitoring devices 1 switch from the normal mode of operation to a pressure drop mode if a check of the pressure signals provided by the pressure sensor 1a indicates a drop in the pressure of a speed exceeding a pre-defined threshold value. This check is conducted by the control units 1c of the tire pressure monitoring devices 1. In the simplest case, a comparator device is sufficient to compare the difference between a pressure measurement value and the preceding pressure measurement value with a pre-defined threshold value. If a dangerously high pressure drop speed is detected, data telegrams are transmitted in second time intervals, which are shorter than the first time intervals. For example, the first time intervals can be 1 to 2 minutes for a travel speed of 50 km/h, while the second time intervals are only 1 to 2 seconds.

In a travel starting mode at the beginning of a travel, the tire pressure monitoring devices 1 send the data telegrams in third time intervals that are shortened as compared to the normal mode of operation, so as to enable the evaluation unit 2 to carry out an assignment of the characteristic identifiers to the respective wheel position as quick as possible. Below it is explained (with reference to FIG. 2) how the transmission operation in the travel starting mode is controlled.

Figure 2:
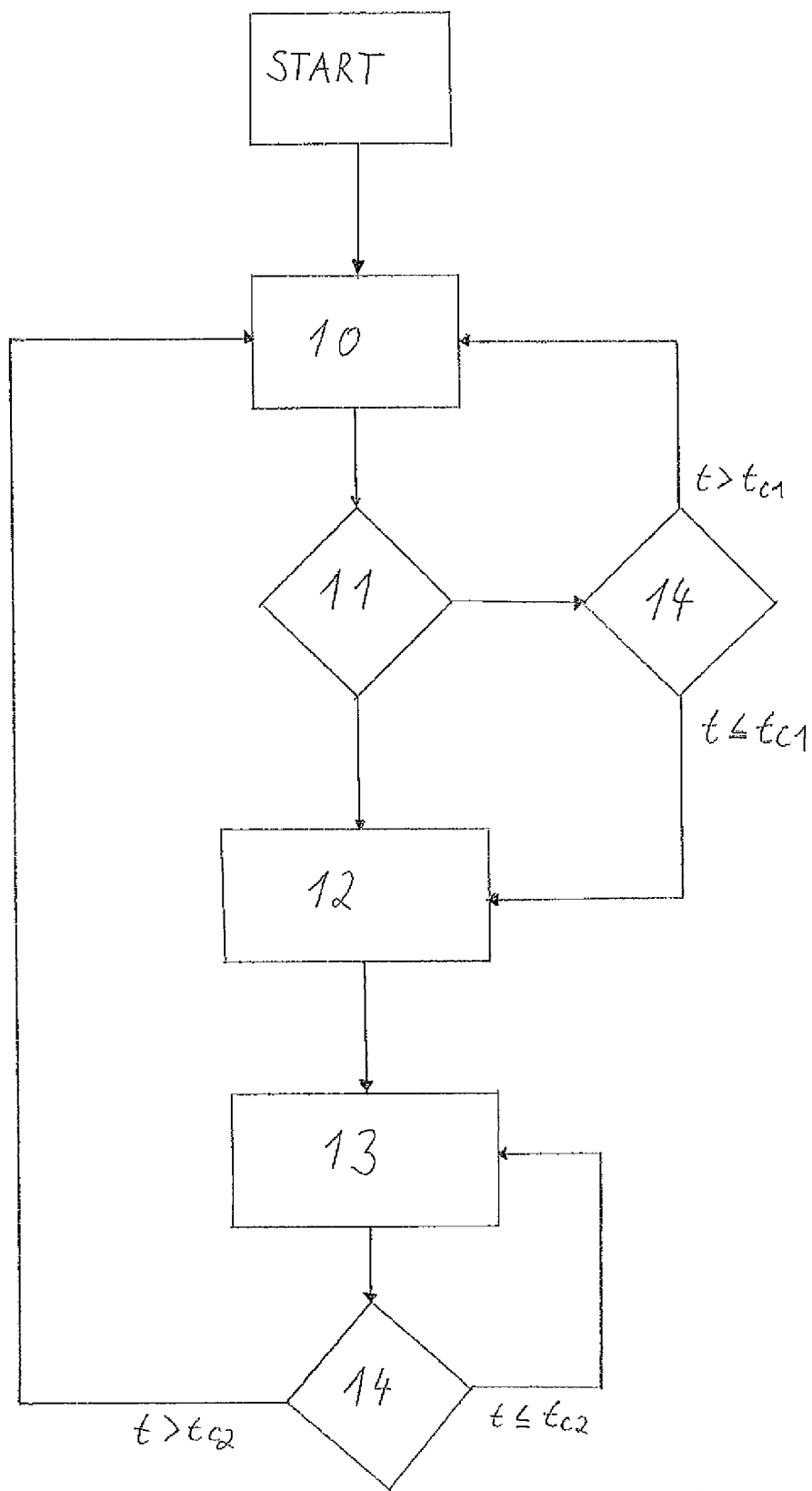
FIG. 2 shows a schematic diagram of the sequence of a method, which is carried out in a tire pressure monitoring device for controlling the transmission operations

The flow chart in FIG. 2 begins with the actuation of the roll sensor 1b after a long standstill period of the vehicle. When the roll sensor 1b is actuated, the tire pressure monitoring device 1 begins transmitting the data packet consisting of a pre-defined number of data telegrams. In this process, a first part of the packet with a pre-defined number of data telegrams is first transmitted in third time intervals, which are significantly shorter than the first time intervals of the normal operation. This procedure step is shown in FIG. 2 in box 10. The first part of the packet preferably contains at least 3, e.g. 4 or 5, data telegrams. The third time intervals are preferably constant and can, for example, last for 1 to 5 seconds. The data telegrams of the first part mainly help in conveying information to the central evaluation unit 2 as early as possible, indicating whether there is a pressure loss in any of the vehicle tires that might hamper the roadworthiness of the vehicle.

Subsequently, it is checked (in the procedure step 11) if the roll sensor 1b continues detecting a turning of the wheel. If yes, the tire pressure monitoring device 1 sends (in the procedure step 12) a second part of the data packet and switches to the normal mode of operation, which is symbolized with box 13, after the last data telegram of the second part and thereby the last data telegram of the packet is transmitted. In the given example, the second part of the packet contains 20 more data telegrams, which are also transmitted in the third time intervals, e.g. in a span of 2 seconds respectively. However, if it is found (in the procedure step 11) that the roll sensor 1b no longer detects a turning of the wheel, the transmission operation is interrupted (in the procedure step 14) till the roll sensor 1b is activated once again.

When the roll sensor 1b is activated once again, it is checked (in the procedure step 14) how much time t has passed since the last activation. If this time t is more than a pre-defined critical time span $t_{C1}$, the process of transmitting the data packet is started all over again, i.e. its first part is transmitted according to the procedure step 10. If the time t is less than a pre-defined critical time span $t_{C1}$, the interrupted transmission operation is resumed and the second part of the data packet is transmitted as per procedure step 12. In the given application example, the tire pressure monitoring device 1 sends 20 data telegrams at time intervals of 2 seconds each and then changes over to the normal mode of operation 13.

If no turning of the wheel is detected by the roll sensor 1b in the normal mode of operation 13, the further transmission operation depends upon how much time t passes up to a re-activation of the roll sensor 1b. In a procedure step 14, it is checked whether this time t is more than a pre-defined time span $t_{C2}$. If the roll sensor 1b does not detect a turning of the wheel before its activation during the time span $t_{C2}$ or a longer span, there is a changeover to the travel starting mode when the roll sensor 1b is reactivated, i.e. the process of transmitting the first part of a packet from data telegrams is started as per procedure step 10. If the travel is interrupted only for a shorter period of time, i.e. if the rolling sensor is activated after a time span t, which is lesser than the time span $t_{C2}$, the transmission operation is continued in the normal mode of operation 13.

The pre-defined time span $t_{C1}$ can be equal to the pre-defined time span $t_{C2}$, but this need not be so. The pre-defined time span $t_{C2}$ is preferably at least 10 minutes or better 15 to 30 minutes.

What is claimed is:

1. System for monitoring the tire pressure in vehicles, comprising tire pressure monitoring devices, which are each to be arranged in one of the pneumatic tires of the vehicle and comprise a pressure sensor, a roll sensor, a control unit, a power source and a transmitter, an evaluation unit for installing in the vehicle in a stationary manner comprising a receiver for evaluating data telegrams transmitted by the tire pressure monitoring devices, said data telegrams containing a pressure information and a characteristic identifier of the tire pressure monitoring device, whereby the tire pressure monitoring devices transmit the data telegrams in first time intervals in a normal mode of operation, switch from the normal mode of operation to a pressure drop mode if an evaluation of pressure signals shows a pressure drop having a pressure drop speed exceeding a pre-defined threshold value and transmit data telegrams in the pressure drop mode in second time intervals, which are smaller than the first time intervals, the evaluation unit assigns the characteristic identifiers to the respective wheel positions at the beginning of the travel by means of a statistic evaluation of the reception level of data telegrams, and an activation of the roll sensor at the beginning of a travel causes the corresponding tire pressure monitoring devices to switch to a travel starting mode, in which data telegrams are sent in third time intervals, which are shorter than the first time intervals of the normal mode of operation, wherein the tire pressure monitoring devices begin with the process of transmitting a data packet comprising several data telegrams after switching to the travel starting mode, it is checked, after the transmission of a first part of the data packet, if the roll sensor is still detecting a turning of the wheel, and if not, the process of transmission of the data packet is interrupted, whereby the process of transmitting the data packet is continued further if the roll sensor is re-activated within a pre-defined time span, and the process of transmitting the data packet is started all over again if the roll sensor is re-activated only after the lapse of the pre-defined time span, and whereby the tire pressure monitoring devices switch to the normal mode of operation after complete transmission of a data packet.

2. System as defined in claim 1, wherein the pre-defined time span has the duration of 5 to 30 minutes, preferably 10 to 20 minutes.

3. System as defined in claim 1, wherein the number of data telegrams of the data packet is specified.

4. System as defined in claim 1, wherein the data packet contains a total of 15 to 25 data telegrams.

5. System as defined in claim 1, wherein the first part of the data packet contains several data telegrams, preferably 4 to 6 data telegrams.

6. System as defined in claim 1, wherein it is checked, after the transmission of a second part of the data packet, whether the roll sensor continues detecting a turning of the wheel, and if not, the process of transmission of the data packet is interrupted, whereby the process of transmitting the data packet is continued further if the roll sensor is re-activated within another pre-defined time span and the process of transmitting the data packet is started all over again if the roll sensor is re-activated only after the lapse of this other pre-defined time span.

7. System as defined in claim 1, wherein the duration of the first time intervals depends on the traveling speed.

8. System as defined in claim 1, wherein the second time intervals are constant.

9. System as defined in claim 1, wherein the third time intervals are constant.

10. System as defined in claim 1, wherein a changeover from the normal mode of operation to the travel starting mode takes place only if the rolling switch does not detect a turning of the wheels beforehand during a pre-defined time span.

11. System as defined in claim 10, wherein the pre-defined time span is at least 10 minutes, preferably 15 to 30 minutes.

* * * * *